United States Patent
Heil et al.

(10) Patent No.: US 9,858,081 B2
(45) Date of Patent: *Jan. 2, 2018

(54) GLOBAL BRANCH PREDICTION USING BRANCH AND FETCH GROUP HISTORY

(71) Applicant: International Business Machines Corporation, Armonk, NY (US)

(72) Inventors: Timothy H. Heil, Sammamish, WA (US); Andrew D. Hilton, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 730 days.

This patent is subject to a terminal disclaimer.

(21) Appl. No.: 13/964,456

(22) Filed: Aug. 12, 2013

(65) Prior Publication Data
US 2015/0046682 A1  Feb. 12, 2015

(51) Int. Cl.
*G06F 9/38* (2006.01)

(52) U.S. Cl.
CPC .......... *G06F 9/3844* (2013.01); *G06F 9/3848* (2013.01); *G06F 9/3861* (2013.01)

(58) Field of Classification Search
CPC ..... G06F 9/3806; G06F 9/3842; G06F 9/3861
See application file for complete search history.

(56) References Cited

U.S. PATENT DOCUMENTS

| | | | | |
|---|---|---|---|---|
| 5,864,697 A * | 1/1999 | Shiell | ................... | G06F 9/3848 712/240 |
| 6,055,630 A * | 4/2000 | D'Sa | ..................... | G06F 9/3802 712/203 |
| 6,745,323 B1 * | 6/2004 | Sinharoy | ............... | G06F 9/3848 712/233 |
| 7,984,279 B2 * | 7/2011 | Stempel | ................ | G06F 9/3804 712/237 |

(Continued)

OTHER PUBLICATIONS

Kevin Skadron, Margaret Martonosi, Douglas W. Clark. "Speculative Updates of Local and Global Branch History: A Quantitative Analysis" Journal of Instruction-Level Parallelism, vol. 2, Jan. 2000.*

(Continued)

*Primary Examiner* — Jacob A Patranek
(74) *Attorney, Agent, or Firm* — Mark G. Edwards

(57) ABSTRACT

This disclosure includes a method for performing branch prediction by a processor having an instruction pipeline. The processor speculatively updates a global history register having fetch group history and branch history, fetches a fetch group of instructions, and assigns a global history vector to the instructions. The processor predicts any branches in the fetch group using the global history vector and a predictor, and evaluates whether the fetch group contains a predicted taken branch. If the fetch group contains a predicted taken branch, the processor flushes subsequently fetched instructions in the pipeline following the predicted taken branch, repairs the global history register to the global (Continued)

history vector, and updates the global history register based on branch prediction information. If the fetch group does not contain a predicted taken branch, the processor updates the global history register with a branch history value for each branch in the fetch group.

13 Claims, 6 Drawing Sheets

(56) References Cited

U.S. PATENT DOCUMENTS

| | | | |
|---|---|---|---|
| 2005/0216714 A1* | 9/2005 | Grochowski | G06F 9/30072 712/240 |
| 2005/0268075 A1* | 12/2005 | Caprioli | G06F 9/3848 712/239 |
| 2006/0149951 A1 | 7/2006 | Abernathy et al. | |
| 2006/0236080 A1* | 10/2006 | Doing | G06F 9/3844 712/238 |
| 2009/0125707 A1* | 5/2009 | Olson | G06F 9/3848 712/240 |
| 2012/0072708 A1 | 3/2012 | Dunn et al. | |
| 2015/0032997 A1* | 1/2015 | Eickemeyer | G06F 9/30058 712/206 |

OTHER PUBLICATIONS

Andre Seznec, Stephen Felix, Venkata Krishnan, Yiannakis Sazeides. "Design Tradeoffs for the Alpha EV8 Conditional Branch Predictor" Proceedings of the 29th Annual International Symposium on Computer Architecture (ISCA.02).*

* cited by examiner

GLOBAL BRANCH PREDICTION USING BRANCH AND FETCH GROUP HISTORY

FIELD

This disclosure relates to branch prediction. In particular, it relates to global branch prediction using fetch group history and branch history.

BACKGROUND

In a pipelined processor, a program's instructions are processed sequentially through an instruction pipeline. The instruction pipeline is broken into stages which perform particular steps involved with an instruction's processing. This pipelined structure allows multiple instructions to be processed simultaneously, with each stage performing a different step of an instruction's processing.

Programs may contain conditional branch instructions. If a conditional branch is taken, the program will break from the current sequence of instructions to the target of the conditional branch; if a conditional branch is not taken, the program will continue the current sequence of instructions. Whether the conditional branch will be taken cannot be determined until later in the pipeline after the instruction has been decoded and executed. However, conditional branches may follow a predictable behavior, and whether a conditional branch will be taken, also known as the direction of the branch, may be predicted earlier in the instruction pipeline. A processor may speculatively fetch the next instruction in the program based on the predicted behavior of the branch. If the branch is predicted taken, the processor may fetch the next instruction from an address predicted by a branch target predictor. If the branch is predicted not taken, the processor may fetch the next instruction of the next sequential instruction address. The branch direction may be predicted before the instruction is decoded and may be checked at branch resolution once the instruction is executed. If the branch prediction was wrong, the fetched instructions are flushed from the instruction pipeline.

A dynamic branch prediction mechanism may use a history of branch outcomes to predict whether a branch instruction will be taken. Typically, a branch prediction system will contain a branch history and a predictor. The predictor is often a prediction history table of saturating counters that are indexed by the branch history and an instruction address, and output a branch prediction value. A prediction history table may also be known as a branch history table or pattern history table. The branch history may include local history or global history. Local history uses the history of each independent branch to index into a prediction history table. The local history for each branch may be stored as an entry in a local branch history table. Global history uses the combined history of all recent branches, rather than specific individual branches, and is often stored as a vector in a register. Global history may be combined with the instruction address to index into a prediction history table.

One common mechanism of global branch prediction involves storing global history as a global history vector (GHV) in a global history register (GHR). FIG. 1 is a diagram of a branch prediction mechanism that uses index sharing to select a counter in a prediction history table commonly known as gshare. A branch's instruction address 101 and a global history vector of the global history register 102 are combined through XOR logic 103 to form an index value. The index value indexes into a prediction history table 104. The prediction history table entry outputs a prediction of whether the branch is taken or not taken. The next instruction is fetched according to whether the branch is predicted as taken or not taken. Once the instruction is executed and the branch is resolved, the associated entry in the prediction history table is updated with the taken/not taken information for the branch. However, the global history register must be updated speculatively based on the predicted direction. If this is not done, subsequent branches would be predicted with the wrong global branch history, leading to poor predictions. The global history register may be updated by shifting a first logical value into the register if the branch is taken and a second logical value if the branch is not taken. Often, a branch must be predicted before the branch prediction table has been updated with the most recent branch prediction information.

For program execution, a processor may fetch a group of sequential instructions from an instruction cache, known as a fetch group. If a fetch group contains one or more taken branch, the instructions up through the first taken branch will be processed, after which the remaining instructions in the fetch group must be discarded and the pipeline flushed.

SUMMARY

In an embodiment, a method for performing branch prediction by a processor having an instruction pipeline includes a processor that speculatively updates a fetch group history of a global history register, wherein the global history register comprises the fetch group history and a branch history, and fetches a fetch group of instructions. The processor assigns a global history vector to the instructions of the fetch group, wherein the global history vector is a value of the global history register when the instructions are fetched. The processor predicts a direction of any branches in the fetch group using the global history vector and a predictor and evaluates whether the fetch group contains a predicted taken branch. If the fetch group contains a predicted taken branch, the processor flushes subsequently fetched instructions in the front-end of the instruction pipeline following the predicted taken branch, repairs the global history register to the global history vector, and updates the fetch group history of the global history register based on branch prediction information. If the fetch group does not contain a predicted taken branch, the processor updates the branch history of the global history register with a branch history value for each branch in the fetch group.

In another embodiment, a method for maintaining a global history register having a fetch group history and a branch history includes shifting a first value, representing a first fetch group, into the fetch group history when the first fetch group is fetched and shifting a second value, representing a second fetch group, out of the fetch group history when the second fetch group is branch predicted. If the branch predictions of the second fetch group correspond to the second value, then the processor shifts a first number of branch history values, representing the branch predictions for the second fetch group, into the branch history. If the branch predictions of the second fetch group do not correspond to the second value, then the processor updates the global history register to a first global history vector associated with the second fetch group and updates the fetch group history of the global history register to reflect the branch predictions of the second fetch group.

In another embodiment, a computer system having branch prediction includes an instruction pipeline circuit, a branch prediction circuit, and a global history update circuit. The instruction pipeline circuit includes an address register for fetching instruction addresses, an instruction cache for storing fetched instructions, and an instruction queue for storing decoded instructions. The branch prediction circuit includes a global history register maintaining a global history vector, wherein the global history register comprises a fetch group history portion and a branch history portion, a predictor for predicting a direction of any branches in the fetch group, and combination logic for combining an instruction from the instruction register with the global history vector for indexing into the predictor. The global history update circuit includes a storage register for storing the global history vector associated with the fetch group and fetch group history check logic. The fetch group history logic is configured for speculatively updating the fetch group history of the global history register with a fetch group history value for the fetch group, evaluating whether the fetch group contains a predicted taken branch, flushing instructions from the instruction queue when the fetch group contains a taken branch, repairing the global history register to the global history vector stored in the storage register when the fetch group contains a taken branch, updating the fetch group history of the global history register based on branch prediction information from the predictor when the fetch group contains a taken branch, and updating the branch history of the global history register with a branch history value for each branch in the fetch group when the fetch group does not contain a taken branch.

BRIEF DESCRIPTION OF THE DRAWINGS

The drawings included in the present application are incorporated into, and form part of, the specification. They illustrate embodiments of the present invention and, along with the description, serve to explain the principles of the invention. The drawings are only illustrative of typical embodiments of the invention and do not limit the invention.

FIG. 3A displays fetch group, instruction, branch prediction, branch history, and fetch group history for a number of fetch groups of instructions. FIG. 3B displays global history vectors in a global history register for different fetch groups passing through an instruction pipeline.

DETAILED DESCRIPTION

Figure 1:
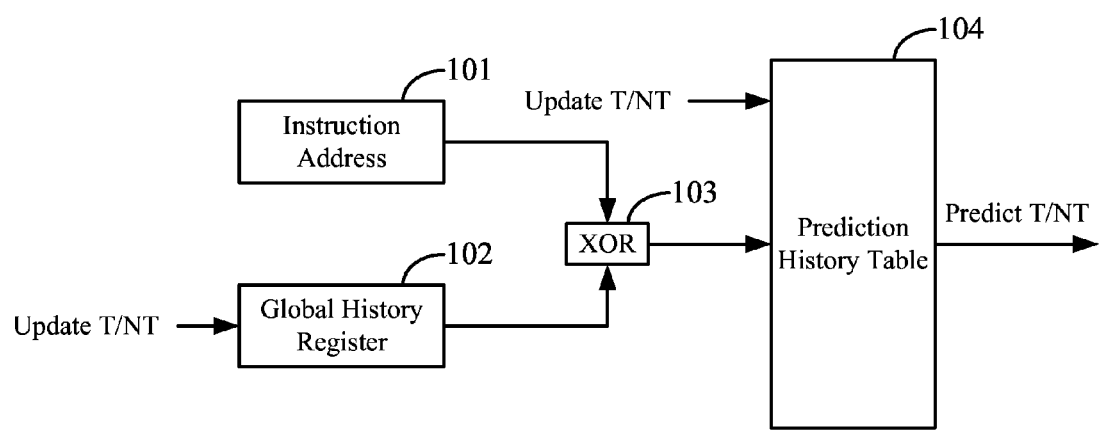
FIG. 1 is a diagram of a branch prediction mechanism that uses index sharing to select a counter in a prediction history table.

A global branch prediction mechanism may utilize branch history for the global history. A first group of instructions is fetched and a global history register is accessed for branch prediction of the group of instructions. Branch prediction logic takes several cycles to determine the presence and direction of any branches in the first group of instructions, during which other groups of instructions are similarly fetched. Once any branches in the first group of instructions are predicted, the global history register may be updated with the branch prediction information of the first group of instructions and used for branch prediction of an incoming group of instructions, several cycles after the first group of instructions was fetched. This means the global history used to predict a current fetch group will be based on the branch predictions of instructions several cycles earlier, and will not account for any branches from the instructions in between the current instructions being fetched and the instructions upon which the global history is based.

A branch prediction mechanism may utilize fetch group history instead of branch history. Fetch group history includes a record of whether a taken branch is present in a fetch group of instructions. The kind or number of branches in the fetch group is not indicated, only the presence of a taken branch, so a fetch group history entry will always be a set number of bits long, usually one. However, fetch group history is not as accurate as branch history, as it does not distinguish between a fetch group having branches not taken and a fetch group with no branches; nor does it distinguish between a fetch group having only a taken branch and a fetch branch with both taken and not taken branches.

In branch history, the number of bits to be updated in a global history register in a cycle is equal to the number of branches in the fetch group. In order to update the global history register, the processor must predict both the number of branches and whether those branches are taken. For example, if a fetch group of four instructions contains two not taken branches, the global history register will be updated with two bits corresponding to those branches. Likewise, if the fetch group contains three not taken branches, then the global history register will be updated with three bits corresponding to those branches. Because the number of bits to be updated to the global history register is not constant, the global history register cannot be updated until any branches in the fetch group are predicted. If the global history register was to be updated speculatively with a set number of bits, indexing into the predictor would be inconsistent and branch prediction inaccurate.

By contrast, in fetch group history, the number of bits to be updated in the global history register remains constant for each fetch group. For example, if a fetch group of four instructions contains two not taken branches, the fetch group history bit may indicate a "zero". If the fetch group contains one taken branch, the fetch group history bit may indicate a "one". Because the number of bits remains constant, the global history register may be speculatively updated with a prediction value for the fetch group, later to be corrected if needed. Until any branches are predicted, as is the case for the first few cycles of the instruction fetch and decode, the processor will continue to fetch instructions sequentially. Therefore, the global history register may be speculatively updated with a "no taken branches" entry into the global history register. If it is later determined that there were taken branches in the fetch group history, the pipeline must be flushed and the global history register may be updated with the corrected fetch group history information.

Method Overview

According to embodiments of the invention, a global history mechanism may contain fetch group history for the most recent global history information and branch history for the remainder of the global history information. The diagram below is an exemplary global history vector of a global history register that utilizes both fetch group history and branch history for global branch prediction. Each box represents one bit, the fetch group history having three bits and the branch history having seven bits.

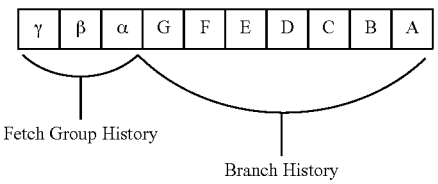

In this example, a bit value associated with the fetch group will move from left to right through the fetch group history of the global history register for each cycle. After the third pipeline cycle, the direction and number of any branches in the fetch group will have been predicted and the fetch group history can be converted to branch history.

If no branches are present in the fetch group, no branch values will be shifted into the branch history portion of the vector. If one or more not taken branches are predicted in the fetch group, with no taken branches, a "not taken" value is shifted into the branch history for each not taken branch in the fetch group. If one or more taken branches are predicted in the fetch group, a "not taken" value is added to the branch history portion for each not taken branch leading up to the first taken branch, and a "taken" value is shifted into the most recent bit position of the branch history.

The global history vector of the global history register at the time a fetch group is fetched will be associated with the instructions of that fetch group as they move through the pipeline. All instructions in the fetch group will use the same global history vector for branch prediction and correction of the global history register. If, after branch prediction of the fetch group, it turns out the bit value associated with the fetch group is incorrect, the global history register is corrected to the global history vector of the fetch, with a correction for the incorrect bit value. Similarly, if any of the instructions of the fetch group are mispredicted, global history register will be updated with the fetch group's global history vector, but with the misprediction corrected. The global history vector of the instructions of the fetch group will also be used after instruction execution to update the prediction history table with taken/not taken information. In addition to the global history vector, a branch counter is associated with a fetch group to track the number of branches in a fetch group with which to update the global history register's branch history.

Method Structure

Figure 2:
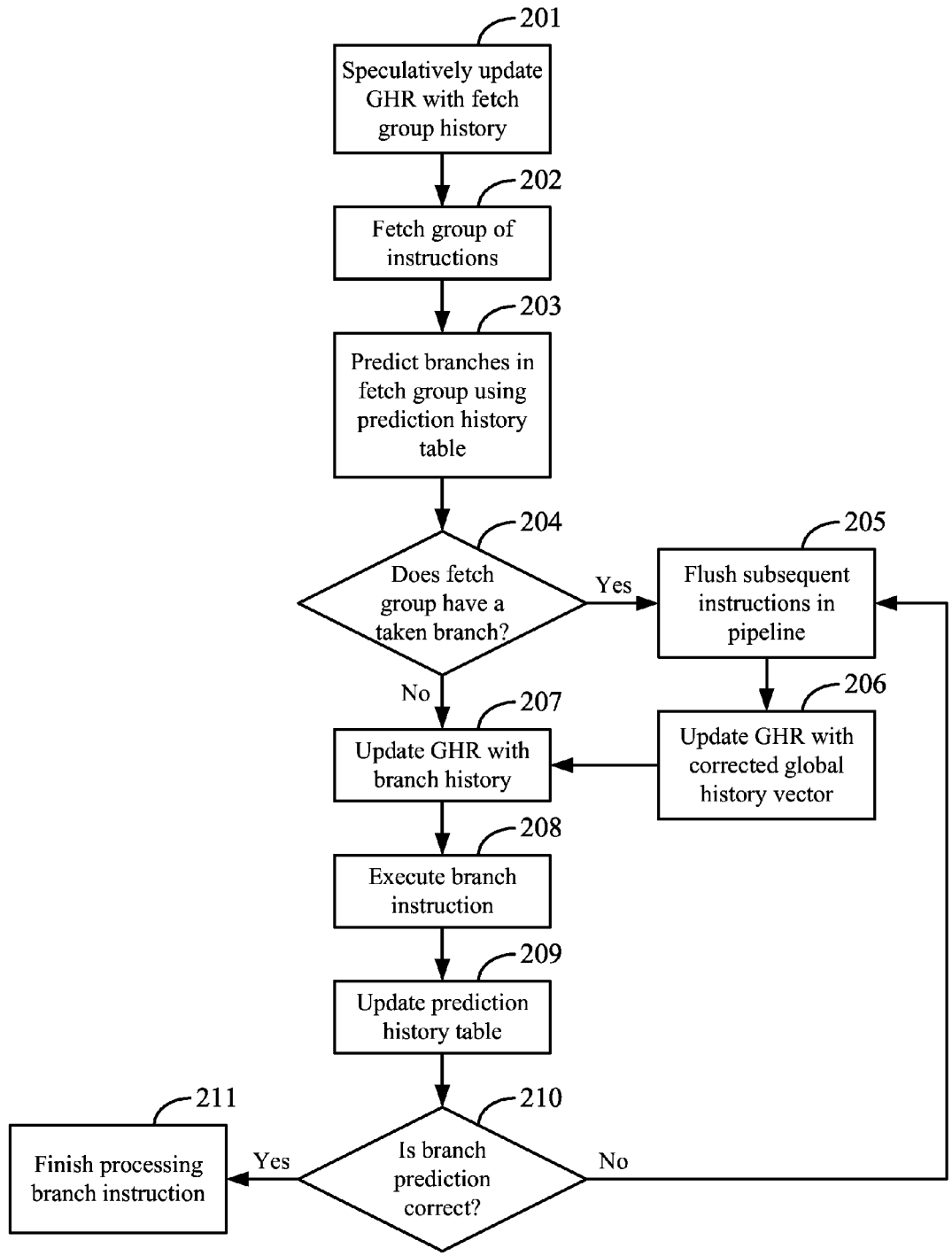
FIG. 2 is a flowchart of an instruction through the fetch and decode stages of a pipeline using fetch group and branch history for global history, according to embodiments of the invention.

FIG. 2 is a flowchart for instructions passing through a processor pipeline using fetch group and branch history for global history, according to embodiments of the invention. A global history register contains a global history vector and is updated with the fetch group history for a fetch group of instructions, as in 201. The fetch group of instructions is fetched, as in 202, and the global history vector at the time of fetching the group of instructions is assigned to the instructions. The global history vector combines with an instruction address of one of the instructions and indexes into a prediction history table. After several cycles any branches in the instructions of the fetch group are predicted as taken or not taken, as in 203. The fetch group is evaluated for any predicted taken branches, as in 204. If the fetch group contains a predicted taken branch, the subsequent instructions in the fetch group and in other subsequent fetch groups in the pipeline are flushed, as in 205, and the global history register is repaired to the global history vector of the fetch group corrected for the fetch group history, as in 206. Any branch instructions of the fetch group, which ended at the taken branch, will be converted to branch history, as in 207.

Still referring to FIG. 2, if the fetch group does not contain any predicted taken branches, the global history register is updated with branch history consisting of branch predictions, if there are any, of the outgoing fetch group, as in 207. The outgoing fetch group of the fetch group history is converted to branch history, and the branch history bits for the fetch group are shifted into the branch history of the global history register. Later down the pipeline, the instructions are executed and resolved, as in 208, and the prediction history table is updated with branch information, as in 209. The resolved outcomes of the branches are compared with their predictions, as in 210. If any branches were mispredicted, the subsequent instructions in the fetch group and in other subsequent fetch groups in the front-end of the pipeline are flushed, as in 205, and the global history register updated with the corrected global history vector, as in 206. If there are there are no mispredicted branches, the branch instruction finishes processing through the instruction pipeline, as in 211.

Speculative Fetch Group Prediction

Referring to element 202 of FIG. 2, when a fetch group is first fetched, the fetch group history is speculatively updated. Generally, if a processor does not know the outcome of a branch, the processor will sequentially fetch instructions under the assumption that any branches present are not taken. Therefore, the fetch group history may be speculatively updated with a "no branches taken" value until the branch directions of the fetch group are determined. For example, when a fetch group of instructions are fetched, it may be assumed that the instructions contain no taken branches, and the global history register may be updated with a "0" bit value in the first bit position of the fetch group history portion of the global history vector.

The value of the global history register at the time of fetching the fetch group of instructions will be associated with the fetch group as its global history vector. This global history vector may be used for branch prediction of the instructions of the fetch group, update of the branch predictor after branch resolution, and correction of the global history register if the fetch group or any branches in the fetch group are mispredicted. The global history vector may be retained in a register associated with a particular stage of the pipeline or along with the instruction at it moves through the pipeline or instruction queue.

Branch Prediction Determination

Referring to element 204, upon prediction of branch direction, two possibilities exist: the fetch group contains no predicted taken branches and the speculative prediction was correct, or the fetch group contains a predicted taken branch and the speculative prediction was incorrect. If the fetch group contains no taken branches, then the processor continues to fetch instructions sequentially. The branch predictor may not convert the fetch group's fetch group history into branch history until the enough subsequent groups of instructions are fetched so that the fetch group's fetch group history is no longer needed to fill the global history register's fetch group section. If there are no stalls, the fetch group's fetch group history may be converted to branch history in the same cycle in which prediction is complete; however, if there are stalls in fetching due to branches or misses, there may be several cycles between branch prediction and conversion from fetch group history to branch history. In other words, the number of cycles for a fetch group's branches to be predicted is dependent on the branch prediction architecture, and the number of cycles for a fetch group's fetch group history to be converted to branch history is dependent on the number of subsequent fetch groups fetched and present in the fetch group history of the global history register. Once enough instructions have been fetched so that the fetch group's history is no longer needed to fill the fetch group history part of the global history register, the fetch group's history may be converted from fetch group history to branch history. Any not predicted taken branches may be updated to the branch history of the global history register. For example, if the fetch group contains two not taken branches, two "zeroes" may be shifted into the first two bit positions of the branch history.

If the fetch group contains a taken branch, the instructions in the instruction pipeline subsequently fetched after the taken branch must be flushed and the global history register must be repaired and updated with the correct fetch group history. Any instructions fetched after the taken branch may be unused, as they were fetched sequentially, and the next fetch group will be redirected to the target branch address. As mentioned above, the global history vector and the branch counter associated with a fetch group of instructions will be retained with the instructions. The global history register will be repaired by updating this retained global history vector with fetch history that reflects the predicted taken branch. For example, the fetch group history may update a "one" into the first fetch group history position, representing the fetch group containing the taken branch, as well as the remaining fetch group history positions containing the previous fetch group history before the taken branch fetch group.

The branch prediction mechanism may have a branch counter for a fetch group to keep track of the number of branches in the fetch group. The branch counter information may be used to update the branch history part of the global history vector with branch history information when the fetch group history is converted to branch history. For example, the branch predictor may keep track of the last branch predicted in a fetch group, and assume every remaining branch in the fetch group is a not taken branch, for which it may use the branch counter information. The branch counter may also be used for correcting any mispredictions, as the number of branches in a fetch group may change depending on whether a branch in the fetch group is taken or not taken. When a previously mispredicted group has its fetch group history converted into branch history, the branch counter may correctly update the global history register. The branch counter information may be kept until the branches associated with the fetch group are resolved later in the pipeline and will no longer be used for branch prediction purposes. The branch counter may be a set bit entry in a register, indexed to a particular fetch group. For example, the counter may be a two-bit counter representing 0 to 4 branches, with 3 and 4 branches sharing a two-bit logical value.

Misprediction Correction

Referring to element 208 of FIG. 2, upon resolution of a branch in the fetch group of instructions, the branch prediction of that branch from an earlier stage is evaluated against the branch resolution of the branch. If the branch was mispredicted, the instructions following the branch are flushed. The global history register is repaired to the branch's global history vector regardless of whether the branch was resolved taken or not taken, but whether the global history register is further corrected with fetch group history depends on whether the branch was resolved taken or not taken and, if resolved not-taken, whether the next sequential instruction is part of the mispredicted fetch group.

If the branch is resolved taken (and so speculated not taken and predicted not taken), the global history register is repaired to the original global history vector of the branch's fetch group and further corrected by placing a logical value representing a taken branch into the first fetch group history bit position.

If the branch is resolved not taken (and so speculated not taken and predicted taken), the global history register is repaired to the global history vector for the fetch group and the next sequential instruction to be fetched is evaluated for whether would have been part of the same fetch group as the mispredicted branch. For example, in a processor that fetches power-of-two instructions in each fetch group, whether the next instruction is part of the predicted branch's fetch group may be determined by looking at the number of address bits according to the power. If the next instruction would have been part of the fetch group, then the global history vector does not undergo any further correction. However, if the next instruction would have been part of a new fetch group, then the global history vector is treated as if a new group has been fetched. In that instance, the global history vector is corrected by shifting a speculative "no branches taken" bit into the first bit position of the global history vector, as in 201.

In addition to the global history vector update, the branch counter mentioned above must also be corrected. If a predicted not taken branch is resolved taken, any not taken branches occurring after the taken branch will no longer be included in the fetch group, and the branch counter may be updated to reflect this. If a predicted taken branch is resolved not taken, then the number of branches in the fetch group may increase, had they not been discarded following the taken branch determination, and the branch counter may be updated to reflect this increase.

Prediction Update

Referring to element 209, once a branch is resolved, the predictor may be updated with branch resolution information for the branch. In the case of a prediction history table, the global history vector and the branch instruction's address were combined to produce an index value, which indexed into an entry in the prediction history table. That entry is accessed and updated with branch history information. When the prediction history table has saturating counters, the counter associated with the entry is incremented according to the branch outcome. For example, if the entry had a value of "10", where "0" is not taken and "1" is taken, and the branch was resolved taken, the new entry may read "11".

Exemplary Method

Figure 3A:
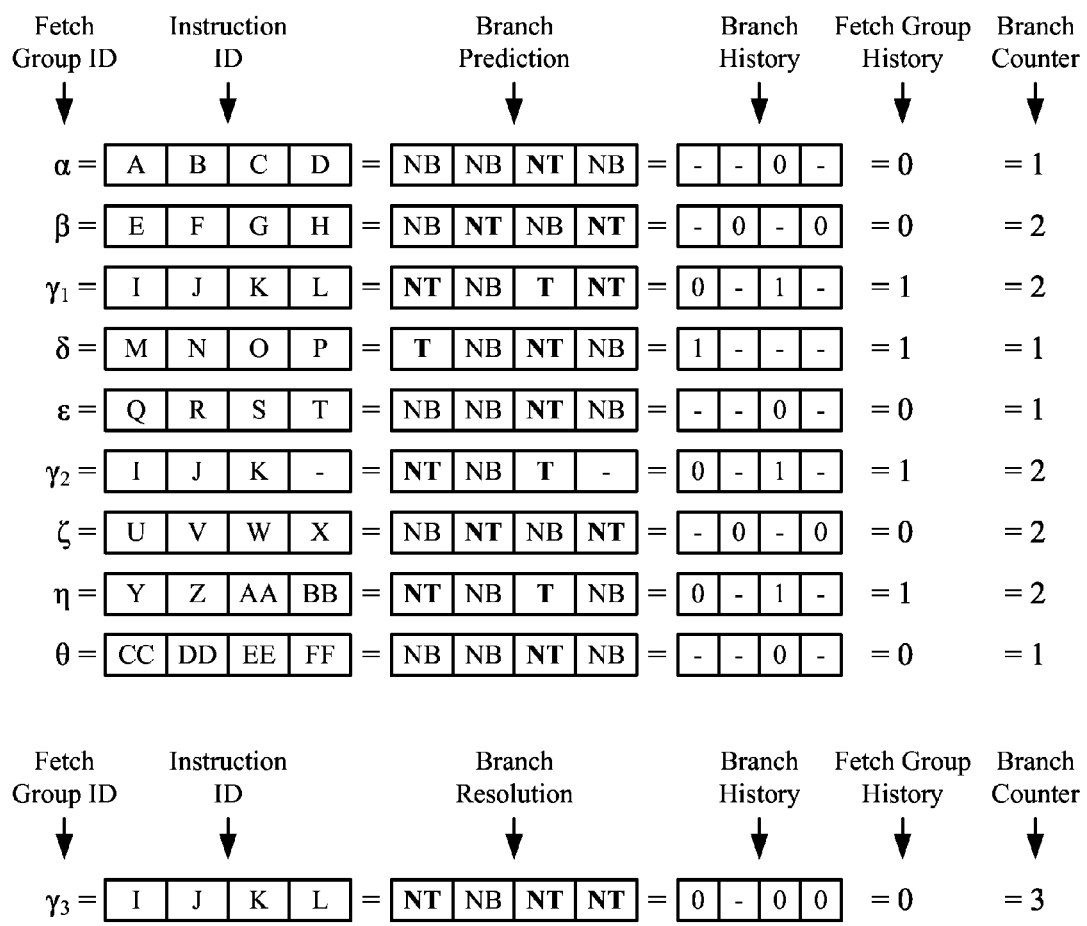
FIG. 3A and FIG. 3B are diagrams and examples of the operation of a global history register utilizing fetch group history and branch history through the branch resolution stage, according to embodiments of the invention.

FIG. 3 is a diagram and example of the operation of a global history register utilizing fetch group history and branch history through the branch resolution stage, according to embodiments of the invention. FIG. 3A displays fetch group, instruction, branch prediction, branch history, fetch group history, and branch counter information for a number of fetch groups of instructions. Under the Fetch Group ID column, the Greek symbols represent different fetch groups that are fetched sequentially according to their order. Under the Instruction ID column, the letters represent the different instructions contained within the fetch groups, four per group. The instructions for each fetch group are fetched and decoded in parallel, but are cached and buffered sequentially. Under the Branch Prediction/Resolution column, the letter combinations NB (no branches), NT (branch not taken), and T (branch taken) represent the branch prediction or lack of prediction of each instruction. Under the Branch History column, the binary numbers represent the branch history bits to be added to the branch history portion of the global history vector, where a "0" represents a not taken branch, a "1" represents a taken branch, and a "-" represents either no branch or a branch within a fetch group occurring sequentially after a taken branch. Under the Fetch Group History column, the binary number represents whether a fetch group contains one or more taken branches ("1"), or no taken branches ("0"). Under the Branch Counter column, the number represents the number of branches in the fetch group that are used for the branch history portion of the global history vector. For the first three cycles of an instruction fetch/decode, no information in the Branch Prediction/Resolution, Branch History, Fetch Group History, or Branch Counter columns are known; this information is only know after identifying branches and predicting the outcome of the branches.

Figure 3B:
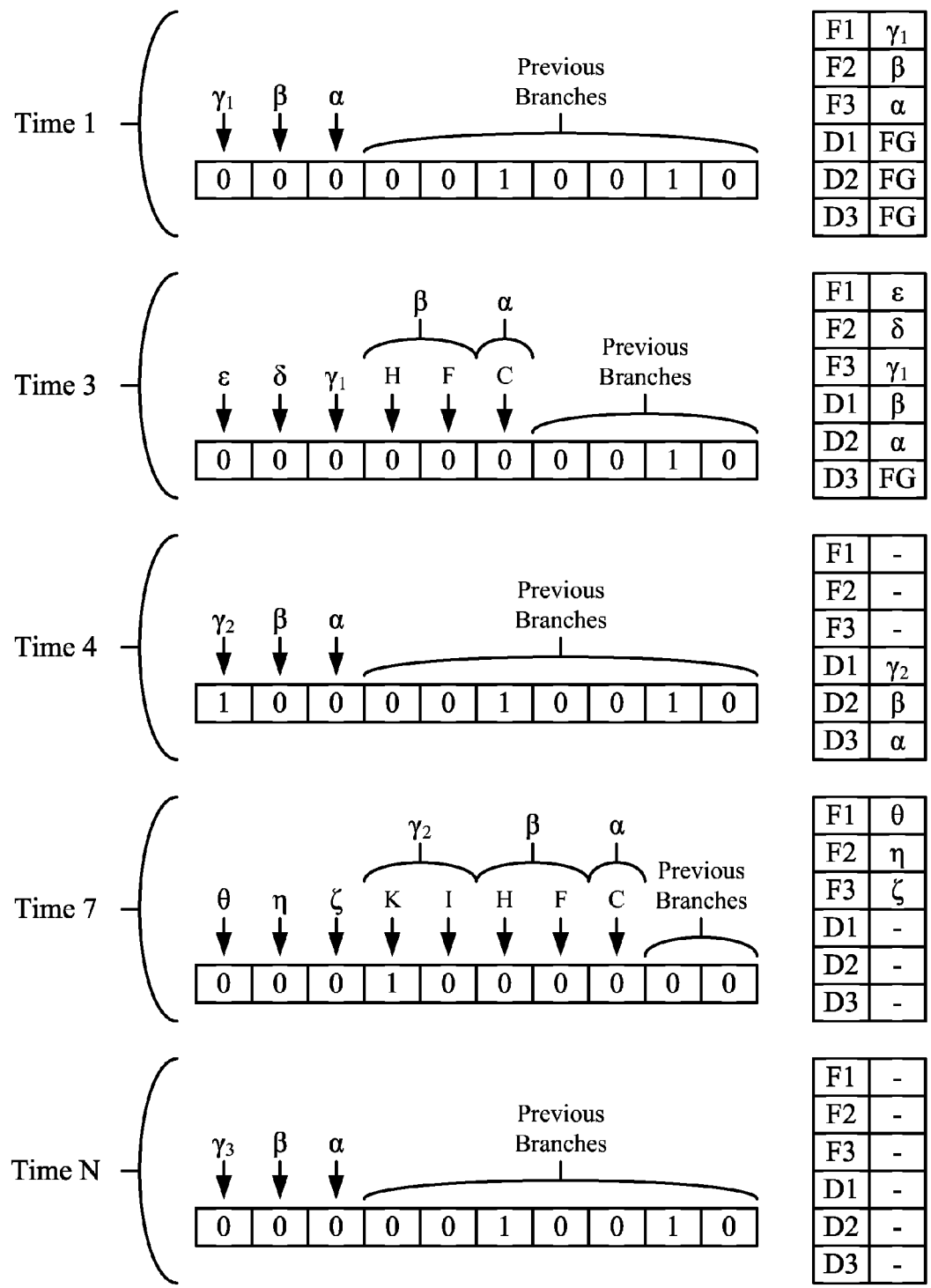

FIG. 3B displays global history vectors in a global history register for different fetch groups passing through an instruction pipeline. Time 1 represents a snapshot of the global history register at a reference time 1, as fetch group γ is fetched. Time 3 represents a snapshot of the global history register two cycles after Time 1, just before any branches in fetch group γ are predicted. Time 4 represents a snapshot of the global history register one cycle after Time 3, after a taken branch is predicted in fetch group γ and the global history register updated with fetch group γ's corrected fetch group history. Time 7 represents a snapshot of the global history register three cycles after Time 4, after the global history register is updated with fetch group γ's predicted branch history. Time N represents a snapshot of the global history register multiple cycles after Time 7, after a branch in fetch group γ is resolved, the branch's prediction determined to be incorrect, and the global history register updated with fetch group γ's corrected fetch group history. The tables next to each Time X represent the fetch group in each stage of a processor pipeline having three fetch cycles and three decode cycles, which are F1 (Fetch 1), F2 (Fetch 2), F3 (Fetch 3), Decode 1 (D1), Decode 2 (D2), and Decode 3 (D3). While the tables show sequential groups coming in sequential cycles, this may not always be the case due to delays in the pipeline.

At Time 1, fetch groups γ, β, and α are in cycles F1, F2, and F3, respectively. The global history register has just shifted in a "0" to the first fetch group history bit position, representing a speculative prediction that fetch group γ contains no taken branches. Fetch groups β and α have been speculatively predicted to have no taken branches one and two cycles ago, respectively, and have shifted one bit position as fetch group γ's fetch group history was shifted into the global history register. Previous other branches have been predicted and are not important for this example.

At Time 3, fetch groups ε, δ, and γ are in cycles F1, F2, and F3, respectively, and are speculatively predicted as not taken in the fetch group history. Fetch groups β and α are in cycles D1 and D2, respectively, and have had their branches predicted (C, F, and H). The fetch group history bits associated with fetch groups β and α have been shifted out of the fetch group history and into the branch history, as their branches have been predicted (all not taken, or "0").

At Time 4, fetch group γ is decoded in stage D1 and any branches in fetch group γ predicted. Fetch group γ contains a predicted taken branch at instruction K. At this point, the pipeline following the taken branch must be flushed, including instruction L and fetch groups ε and δ, and fetch group γ is reduced to three instructions. Additionally, the global history register must be updated to reflect the predicted taken branch K and group γ's fetch group history corrected to its actual value. The global history register is returned to the global history vector associated with fetch group γ, which is the global history register at Time 1 when fetch group γ had just been fetched, but with a correction to account for the mispredicted fetch group history for fetch group γ. For this correction, the "0" in the first fetch group history bit position representing no taken branches is corrected to a "1" representing a taken branch.

At Time 7, three cycles have passed since the pipeline was flushed and fetch groups θ, η, and ζ are in cycles F1, F2, and F3, respectively, all speculatively predicted at "0". The instructions of fetch groups γ, β, and α are in the instruction queue for further processing. The fetch group histories of fetch groups γ, β, and α have been shifted out of the fetch group history portion of the global history register and the branch histories of fetch groups γ, β, and α have been shifted into the branch history portion of the global history register (K is taken; I, H, F, and C are not taken).

At time N, multiple cycles have passed and instruction K from fetch group γ has been resolved not taken, after having been predicted taken at Time 4. The instructions subsequently fetched following instruction K are flushed. The next subsequent instruction, L, would have been part of fetch group γ had there been no misprediction. Thus, instruction L is added to fetch group γ and the global history register is returned to the global history vector associated with fetch group γ, but without any further correction. Had instruction L started a new fetch group, the global history register would be further updated to reflect a new fetch group entering the pipeline. Later down the cycle, when fetch group γ is predicted for branches and the branches converted from fetch group history to branch history, the branch counter will be updated to "3", to reflect three not taken branches (I, K, and now L) in the fetch group, rather than "2" (I and K), which was the branch counter value before the misprediction.

Hardware Implementation

Figure 4:
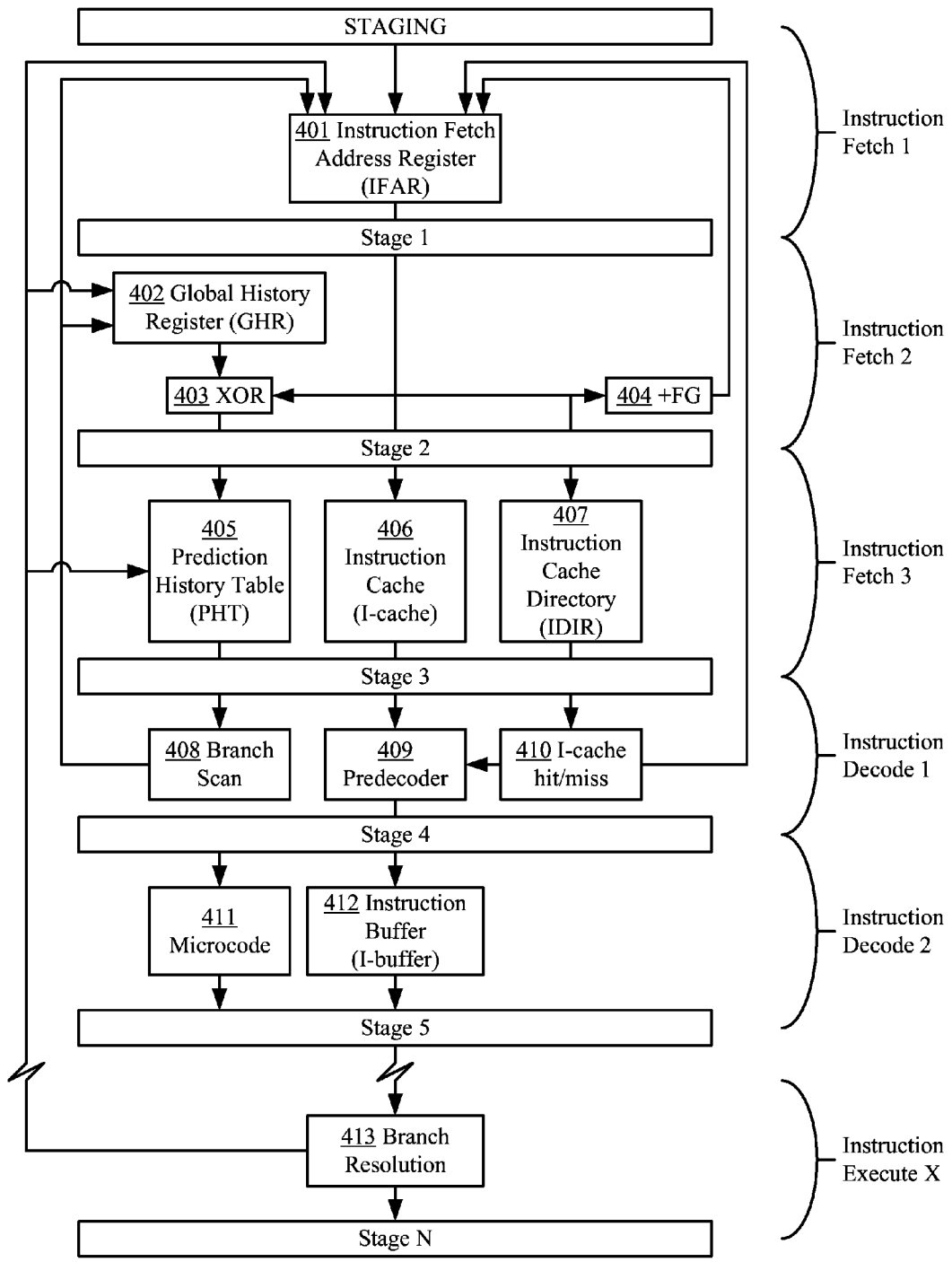
FIG. 4 is an exemplary processor pipeline datapath for utilizing fetch group history and branch history, according to embodiments of the invention.

FIG. 4 is a diagram of a processor pipeline, according to embodiments of the invention. The addresses of instructions in a fetch group are sent from an instruction fetch address register (IFAR) 401. The IFAR 401 is incremented by the fetch group, as in 404. An instruction cache (I-cache) 406 receives the instruction addresses and sends them through a pre-decoder 409 to be grouped. An instruction cache directory (IDIR) 407 confirms the selection prediction of instructions. I-cache hit/miss logic 410 determines whether the instruction was found in the I-cache or not; if the instruction was not found, the IFAR 401 is incremented to reflect the cache miss.

The instruction addresses from the IFAR 401 are each combined by XOR logic 403 with a global history vector in a global history register (GHR) 402 to create an index value. The index value indexes into a prediction history table 405, where the directions of any branches in the instructions are predicted. Branch scan logic 408 scans for branches taken, computes target addresses, and determines whether a branch is an unconditional branch or a taken branch. If a branch is a taken branch, the instruction sequence is interrupted and the IFAR 401 is incremented to the new target address of the predicted taken branch. Any instructions in the fetch pipeline are flushed.

If there are no predicted taken branches, the instructions from the pre-decoder 409 are sent to an instruction buffer (I-buffer) 412, where the instructions are queued for decoding. Microcode 411 may decode some preliminary instructions. The instructions in the I-buffer 412 are executed and branch resolution logic 413 determines whether the branch predictions for the instructions were correct. If a branch prediction was incorrect, the pipeline is flushed, the GBR 402 is backed up to a previous global history vector and updated with fetch history information, and the IFAR 401 is incremented to the correct instruction address.

Figure 5:
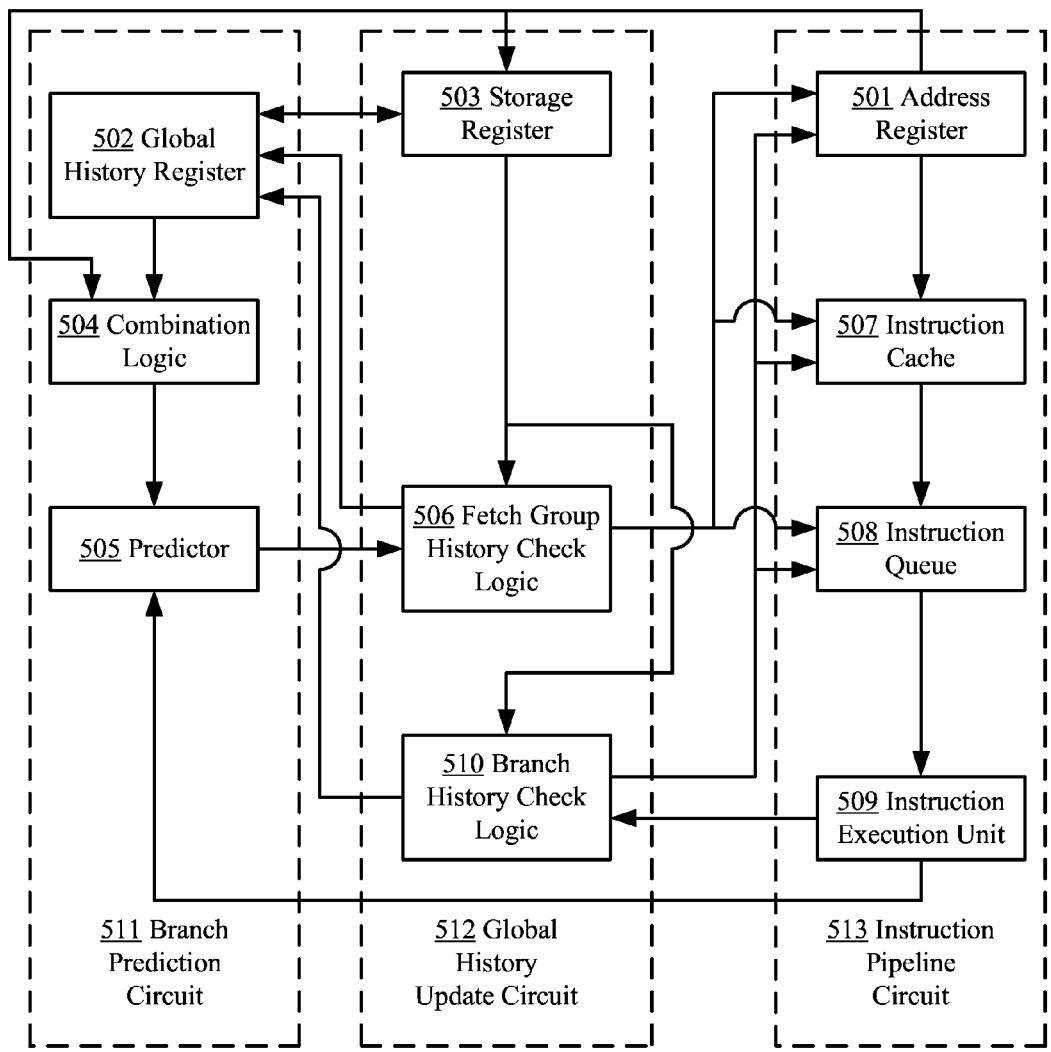
FIG. 5 is a diagram of a computer system configured to perform branch prediction using fetch group and branch history, according to embodiments of the invention.

FIG. 5 is a diagram of a computer system configured to perform branch prediction using fetch group and branch history, according to embodiments of the invention. Generally, the computer system contains a branch prediction circuit 511, a global history update circuit 512, and an instruction pipeline circuit 513. The instruction pipeline circuit 513 contains an address register having addresses of instructions; an instruction cache having addresses of instructions to fetch; an instruction queue having addresses of instructions to decode; and an instruction execution unit 509 for executing instructions. The instruction pipeline circuit 513 may contain other elements for fetching, decoding, and executing instructions, depending on the desired processor architecture. The global history update circuit 512 contains a storage register 503 for storing global history vectors for instructions and branch counters for fetch groups; fetch group history check logic 506 for evaluating a fetch group for taken branches, flushing the instruction pipeline, and updating the global history register 502; and branch history check logic 510 for evaluating the direction of a branch instruction, flushing the instruction pipeline, and updating the global history register 502. The branch prediction circuit 511 contains a global history register 502 having a fetch group history portion and a branch history portion, and used for holding a global history vector; a predictor 505 for predicting the direction of branch instructions; and combination logic 504 for accessing the predictor 505. The branch prediction circuit 511 may contain other branch prediction elements such as a branch history buffer and a local branch history table.

Instruction addresses for a fetch group of instructions are sent from the address register 501 to the instruction cache 507 and the combination logic 504. The global history register 502 sends the global history vector associated with the fetch group to the storage register 503 and the combination logic 504. The combination logic 504 produces an index value from an instruction address and the global history vector. The index value indexes into the predictor 505, which outputs a branch prediction for the instruction. The fetch group history check logic 506 determines whether any instructions in the fetch group contain a taken branch. If there are no predicted taken branches in the fetch group, the instructions are added to the instruction queue 508 and the fetch group history check logic 506 updates the branch history of the global history register 502 with any not taken branch predictions from the fetch group.

If an instruction of the fetch group is a taken branch, the fetch group history logic signals to the instruction cache to flush any instructions following the taken branch. The address register 501 is redirected to the branch target address. The fetch group history check logic 506 repairs the global history register 502 to the instruction's global history vector from the storage register 503 and updates the global history register 502 to the reflect the correct fetch group history for the fetch group. Any instructions from the fetch group that are not flushed are added to the instruction queue 508.

The instructions from the fetch group enter the instruction queue 508 to be executed. The instructions are sent the instruction execution unit 509 for execution, where any branch instructions are resolved. The branch history check logic evaluates whether an instruction's branch prediction from the predictor 505 is correct. If the branch prediction was correct, the instruction continues being processed down the instruction pipeline. If the branch prediction was incorrect, the branch history check logic 510 flushes any instructions following the mispredicted instruction from the instruction queue 508 and the instruction cache 507. The address register 501 is redirected to the taken or not taken branch target address. The branch history check logic 510 repairs the global history register 502 to the instruction's global history vector from the storage register 503 and updates the global history register 502 to the reflect the correct fetch group history for the fetch group. The branch counter in the storage register 503 may be updated as needed to account for the loss of any branches in the fetch group when updating branch history of the global history register 502. The instruction execution unit 509 accesses the predictor 505 and updates the predictor 505 with the branch outcome for the executed instruction.

Although the present invention has been described in terms of specific embodiments, it is anticipated that alterations and modifications thereof will become apparent to those skilled in the art. Therefore, it is intended that the following claims be interpreted as covering all such alterations and modifications as fall within the true spirit and scope of the invention.

What is claimed is:

1. A method for performing branch prediction by a processor having an instruction pipeline, comprising:
   speculatively updating a fetch group history of a global history register, the global history register having the fetch group history and a branch history, wherein
      the fetch group history for each fetch group includes a single one-bit value indicating whether the fetch group includes a taken branch, and
      a branch counter, associated with each fetch group and separate from the fetch group history, stores the number of branches in each fetch group;
   fetching a fetch group of instructions;
   assigning a global history vector to the instructions of the fetch group, wherein:
      the global history vector is a value of the global history register when the instructions are fetched;
   predicting a direction of any branches in the fetch group using the global history vector and a predictor to create branch predictions;
   evaluating whether the fetch group contains a predicted taken branch;
   if the fetch group contains a predicted taken branch:
      flushing subsequently fetched instructions in the instruction pipeline following the predicted taken branch;
      repairing the global history register to the global history vector of the predicted taken branch;
      updating the fetch group history of the global history register based on the branch predictions; and
   if the fetch group does not contain a predicted taken branch:
      updating the branch history of the global history register with a branch history value for each branch in the fetch group based on the branch predictions by using a branch counter associated with the fetch group and the single one-bit value from the fetch group history associated with the fetch group to insert a single one-bit value for each branch of the fetch group as the branch history.

2. The method of claim 1, further comprising:
resolving a branch in the fetch group to create a branch resolution;
updating the predictor with the branch resolution;
evaluating whether the branch prediction of the branch is correct;
if the branch prediction of the branch is not correct:
flushing subsequently fetched instructions in the instruction pipeline following the branch;
repairing the global history register to the global history vector; and
updating the fetch group history of the global history register based on the branch resolution.

3. The method of claim 2, wherein:
the fetch group history of the global history register comprises a first number of fetch group history bits having a first and a last fetch group history bit, wherein each fetch group history bit corresponds to a different fetch group; and
the branch history of the global history register comprises a second number of branch history bits having a first and a last branch history bit, wherein each branch history bit correspond to a branch instruction of a fetch group.

4. The method of claim 3, wherein:
speculatively updating the global history register comprises shifting a first logical value into a first fetch group history bit;
updating the fetch group history of the global history register based on the branch predictions comprises placing a second logical value into the first fetch group history bit.

5. The method of claim 3, wherein updating the branch history of the global history register with a branch history value for each branch in the fetch group further comprises:
shifting a third logical value into the first branch history bit of the global history register for each predicted branch.

6. The method of claim 3, wherein updating the fetch group history of the global history register based on the branch resolution further comprises:
placing a first logical value into the first fetch group history bit of the global history register when the fetch group does not contain a resolved taken branch; and
placing a second logical value into a first fetch group history bit of the global history register when the fetch group contains a resolved taken branch.

7. The method of claim 1, wherein:
the predictor is a prediction history table having saturating counters;
predicting the direction of any branches in the fetch group using the global history vector and the predictor further comprises:
hashing the address of an instruction of the fetch group with the global history vector to create an index value;
indexing into the prediction history table with the index value;
outputting a branch prediction for the instruction;
updating the prediction history table comprises:
accessing the prediction history table with the index value; and
incrementing the saturating counter corresponding to the index value for the prediction history table.

8. The method of claim 3, further comprising:
updating the branch counter of the fetch group with the correct number of branches when the branch prediction of the branch is not correct.

9. A method for maintaining a global history register having a first set of bits allocated to store fetch group history and a second set of bits allocated to store branch history, comprising:
shifting a first one-bit value, representing a first fetch group, into the fetch group history when the first fetch group is fetched,
wherein the fetch group history for each fetch group is a single one-bit value indicating whether the fetch group includes a taken branch;
assigning a branch counter, separate from the fetch group history, to each fetch group, the branch counter storing the number of branches in each fetch group;
shifting a second one-bit value, representing a second fetch group, out of the fetch group history when both the second fetch group is branch predicted and another one-bit value representing another fetch group is available to be shifted into the fetch group history;
if the branch predictions of the second fetch group correspond to the second one-bit value and the other one-bit value is available, then shifting a first number of branch history values, representing the branch predictions for the second fetch group, into the branch history, wherein each branch history value is a bit derived from the second one-bit value and the first number is a value of a branch counter assigned to the second fetch group;
if the branch predictions of the second fetch group do not correspond to the second on-bit value and the other one-bit value is available, then:
updating the global history register to a first global history vector associated with the second fetch group; and
updating the fetch group history of the global history register to reflect the branch predictions of the second fetch group.

10. The method of claim 9, further comprising:
if a first branch from a third fetch group is resolved and the branch resolution of the first branch does not correspond to the first branch prediction of the first branch, then:
updating the global history register to a second global history vector associated with the third fetch group; and
updating the fetch group history of the global history register to reflect the branch resolution of the first branch.

11. The method of claim 9, further comprising:
if the second one-bit value is a first logical value representing no taken branches in the second fetch group, and the second group contains no taken branches, then shifting the first number of branch history values into the branch history further comprises shifting the first number of third logical values into the branch history, wherein the third logical value represents a not taken branch;
if the second one-bit value is a second logical value representing a taken branch in the second fetch group, and the second group contains a taken branch, then shifting the first number of branch history values into the branch history further comprises shifting a second number of third logical values followed by a fourth logical value into the branch history, wherein the second number is equal to the number of predicted not taken branches in the second fetch group and wherein the fourth logical value represents a taken branch;

if the second one-bit value is the first logical value and the second fetch group contains a predicted taken branch, then updating the fetch group history of the global history register further comprises changing a first bit of the fetch group history of the global history register to the second logical value.

12. The method of claim 10, further comprising:

if the first branch was predicted taken and the first branch is resolved not taken, then updating the fetch group history of the global history register further comprises changing a first bit of the fetch group history of the global history register to the first logical value; and if the first branch was predicted not taken and the first branch is resolved taken, then updating the fetch group history of the global history register further comprises changing a first bit of the fetch group history of the global history register to the second logical value.

13. The method of claim 11, wherein:

the third logical value is equal to the first logical value; and the fourth logical value is equal to the second logical value.

* * * * *